United States Patent
Pere et al.

(10) Patent No.: US 11,692,087 B2
(45) Date of Patent: Jul. 4, 2023

(54) PROCESS FOR PRODUCING MONOVINYLAROMATIC POLYMER INCORPORATING POST-CONSUMER RECYCLED POLYSTYRENE, MONOVINYLAROMATIC POLYMER INCORPORATING POST-CONSUMER RECYCLED POLYSTYRENE AND ARTICLES PRODUCED THEREOF

(71) Applicant: Total Research & Technology Feluy, Seneffe (BE)

(72) Inventors: Jose-Maria Pere, Barcelona (ES); Antonio Guinovart, Barcelona (ES); Armelle Sigwald, Nivelles (BE); Laetitia Urbanczyk, Anderlues (BE); Martine Slawinski, Nivelles (BE); Pascal Charlier, Evere (BE); Elodie Perche, Brussels (BE); Serge Eon, Waterloo (BE); Thierry Marcoux, Casteau (BE); Matthieu Adam-Berret, Thimeon (BE)

(73) Assignee: TOTALENERGIES ONETECH BELGIUM, Seneffe (BE)

(*) Notice: Subject to any disclaimer, the term of this patent is extended or adjusted under 35 U.S.C. 154(b) by 0 days.

(21) Appl. No.: 17/404,491

(22) Filed: Aug. 17, 2021

(65) Prior Publication Data
US 2021/0371636 A1 Dec. 2, 2021

Related U.S. Application Data

(62) Division of application No. 16/489,231, filed as application No. PCT/EP2018/054868 on Feb. 28, 2018, now Pat. No. 11,124,638.

(30) Foreign Application Priority Data

Feb. 28, 2017 (EP) .................................. 17158333

(51) Int. Cl.
B29B 17/02 (2006.01)
C08L 25/06 (2006.01)
(Continued)

(52) U.S. Cl.
CPC .............. *C08L 25/06* (2013.01); *B29B 17/02* (2013.01); *C08F 257/02* (2013.01); *C08J 11/04* (2013.01);
(Continued)

(58) Field of Classification Search
CPC .............................. C08J 11/04; C08J 2325/06
See application file for complete search history.

(56) References Cited

U.S. PATENT DOCUMENTS

| | | | | |
|---|---|---|---|---|
| 3,131,996 A * | 5/1964 | Seglin | ...................... | C01D 7/26 23/302 T |
| 2005/0084536 A1* | 4/2005 | Van Buitenen | ...... | B01D 61/145 264/4 |
| 2014/0107307 A1* | 4/2014 | Frost | ....................... | C08F 12/08 526/346 |

* cited by examiner

Primary Examiner — Robert C Boyle
(74) Attorney, Agent, or Firm — Conley Rose, P.C.

(57) ABSTRACT

The invention relates to a process and an installation to produce a monovinylaromatic polymer (3) comprising post-consumer recycled polystyrene (PCR-PS) wherein the process comprises the steps of mixing the PCR-PS (5) and the monovinylaromatic monomer (7) within a dissolver (9) to dissolve the PCR-PS (5) in the monovinylaromatic monomer (7) so as to produce a polymerization mixture (13); and a step of filtering the polymerization mixture (13) that includes continuously redirecting at least a part of the stream of the filtered polymerization mixture (17) back to the dissolver (9) and mixing it with the polymerization mixture (13) so as to continuously reduce the content of insoluble material in the polymerization mixture (13) contained in the dissolver (9).

20 Claims, 3 Drawing Sheets

(51) Int. Cl.
  *C08F 257/02* (2006.01)
  *C08J 11/04* (2006.01)
  *B29B 17/00* (2006.01)
  *B29B 17/04* (2006.01)
  *B29K 25/00* (2006.01)
(52) U.S. Cl.
  CPC ............... *B29B 2017/0015* (2013.01); *B29B 2017/0224* (2013.01); *B29B 2017/0293* (2013.01); *B29B 2017/042* (2013.01); *B29K 2025/06* (2013.01); *C08F 2400/00* (2013.01); *C08J 2325/06* (2013.01)

PROCESS FOR PRODUCING MONOVINYLAROMATIC POLYMER INCORPORATING POST-CONSUMER RECYCLED POLYSTYRENE, MONOVINYLAROMATIC POLYMER INCORPORATING POST-CONSUMER RECYCLED POLYSTYRENE AND ARTICLES PRODUCED THEREOF

CROSS-REFERENCE TO RELATED APPLICATIONS

This application is a divisional of U.S. patent application Ser. No. 16/489,231, filed Aug. 27, 2019, which claims the benefit of PCT/EP2018/054868 filed Feb. 28, 2018, which claims priority from EP 17158333.9 filed Feb. 28, 2017, which are incorporated herein by reference in their entireties for all purposes.

FIELD OF THE INVENTION

The invention relates to an installation and a process for recycling post-consumer recycled polystyrene waste from domestic polymer waste for production of monovinylaromatic polymers such as general-purpose polystyrene (GPPS), expanded polystyrene (EPS) and/or high impact polystyrene (HIPS).

BACKGROUND OF THE INVENTION

Polystyrene is used in the production of various articles such as food containers, refrigerators lines, etc. Polystyrene is very low to biodegrade and frequently not recycled but incinerated. For environmental reasons, it would be interesting for at least a part of these articles made of polystyrene to be recycled. One problem encountered with polystyrene recycling is the collecting, especially the collecting of EPS because of its low density. To be recycled, the waste material needs to be compacted to raise its density.

Another problem comes from the presence of insoluble material such as particulates, non-styrenic polymers, food wastes, metal, etc. within the recycled polystyrene. The processing history (e.g. heat history, shear) of the material also influences the mechanical properties and the processability of the blend comprising post-consumer recycled polystyrene, if the recycled material is not treated. Thus, the mere blending of virgin and recycled resins often results in poor properties on the blend produced.

To overcome these problems, it has been proposed to dissolve the recycled material within a styrenic monomer and to polymerize the resulting mixture. U.S. Pat. No. 8,609,778 discloses such a styrenic resin incorporating post-consumer recycled polystyrene (PCR-PS) and systems and methods for making the same. The styrenic resin obtained can include 20 wt % of PCR PS and has a melt flow rate (MFR) of less than 2.5 g/10 min per ASTM D1238-10. The styrenic resin is produced by a free radical polymerization process performed on a feed having PCR-PS dissolved in monovinylarene monomer. The insoluble material associated with the PCR-PS feed is removed in a continuous mode by a filtering system comprising a self-cleaning filter.

This technology is interesting but has several drawbacks. Indeed, the PCR-PS material to be dissolved contains insoluble material of different types, such as heavy and light material.

A part of the insoluble material is heavy and tends to sediment in the polymerization mixture if not constantly agitated. Thus, if agitation stopped, this generates a deposit, and an accumulation in areas of the bottom of the dissolver where during filtration, material cannot be entrained by pump suction due to the geometry of the bottom of the dissolver. Moreover, during preparation of a following batch with agitation running, the contaminants cannot be moved again because they are sitting in an area of low turbulence Another part of the insoluble material is light and tends to float at the surface of the polymerization mixture, so that it cannot be entrained by the pumps during filtration, even when agitation is running.

After the dilution of the recycled material within the styrenic monomer, the polymerization mixture is filtered and its level within the dissolver is lowering gradually to a point where it is not possible to use the agitating means anymore. In some dissolvers, the agitating means need to be stopped while one third of the polymerization mixture is still in the dissolver.

The agitating means are therefore stopped and the insoluble material, that is heavy, begins to sediment. The concentration of insoluble material has increased by the combination of the heavy and the light insoluble material, indeed even if a part of the heavy material has been removed the content in light material is still the same. Moreover, the concentration of heavy material is not uniform anymore but follow a gradient of concentration. Such high concentration of insoluble material is beyond the processing capabilities of the pumps and of the filters, resulting in a plugging of the pumps and an impossibility for the filters to perform the self-cleaning steps correctly as the polymerization mixture is too charged with contaminants, i.e. too viscous. Batch after batch the accumulation of this material has a consequence on the quantity of PCR that can be added to the batch, which as to be reduced.

Therefore, the dissolver cannot be totally emptied by the pumps, resulting in an accumulation of a concentrated mixture comprising mostly styrenic monomers and insoluble material of different types. FIG. 1 is a picture of such a concentrated mixture found at the bottom of a dissolver and that cannot be pumped anymore for its removal. The removal of said mixture is still a problem to the person skilled in the art as it is not possible to do it manually for health reasons. The solution of providing a dissolver with an outlet valve is not satisfactory because of the high viscosity of the resulting mixture.

One solution would be the sequential re-dissolving and filtration of said concentrated mixture, with the addition of a fresh styrenic monomer to dissolve it and to produce a new polymerization mixture with a lower concentration of insoluble material and to repeat the steps to a point wherein the whole polymerization mixture could be pumped and filtered. However, this is a constraint in productivity, and moreover such a solution is difficult to implement as an agitation of the sedimented mixture in order to dissolve it, is hard to perform. Moreover, it is not satisfactory either because it is expensive and would result in a global reduction of the content of recycled material in the produced monovinylaromatic polymer comprising PCR-PS, whereas there is an interest to increase such content. There is a need for a solution that keeps the content of recycled material in the produced monovinylaromatic polymer comprising PCR-PS as high as possible.

Also, such a solution is not interesting because it does not deal with the insoluble material floating at the top surface of the polymerization mixture and that cannot be pumped with the mixture. As a consequence, even when the polymerization mixture is totally pumped, there is still insoluble material to be removed from the dissolver before another use of said dissolver.

There is a need for a solution that also deals with the floating insoluble material (i.e. the light insoluble material).

Thus, there is still a need to find an installation and a process that overcomes the above-mentioned drawbacks encountered with the installations and processes of prior art.

Another problem encountered with the installation described in U.S. Pat. No. 8,609,778 is that it is an important size and therefore important investments are needed before starting to recycle polystyrene. It could be interesting to find a solution allowing the recycling of polystyrene without the need for important investments.

SUMMARY OF THE INVENTION

The inventors have found that the above drawbacks can be overcome either individually or in combination by a new process and a new installation for filtration of a mixture of PCR-PS dissolved in monovinylaromatic monomer before submitting it to a free-radical polymerization.

According to a first aspect, the invention provides a process to produce a monovinylaromatic polymer comprising post-consumer recycled polystyrene (PCR-PS) wherein the process comprises the steps of:
a) providing the PCR-PS and monovinylaromatic monomer to at least one dissolver;
b) mixing the PCR-PS and the monovinylaromatic monomer within the dissolver to dissolve the PCR-PS in the monovinylaromatic monomer so as to produce a polymerization mixture, wherein the polymerization mixture comprises insoluble material originated from the dissolved PCR-PS;
c) filtering the polymerization mixture in a filtration system in order to obtain a stream of filtered polymerization mixture;
d) ending the filtering of the polymerization mixture and recovering the filtered polymerization mixture;

further wherein the step c) of filtering the polymerization mixture includes continuously redirecting at least a part of the stream of the filtered polymerization mixture exiting the filtration system back to the dissolver and mixing it with the polymerization mixture so as to continuously reduce the content of the insoluble material in the polymerization mixture contained in the dissolver.

As it is understood from the above definition, the invention provides a process wherein the filtering step is conducted without lowering the level of the polymerization mixture within the dissolver. The dissolver is emptied only after the filtering step is ended, therefore avoiding the sedimentation issues. The invention avoids the necessity to perform a cleaning step of the dissolver once it is emptied, as no insoluble material is remaining within the dissolver.

Moreover, the inventors have found that proceeding by filtration in a batch mode with a redirection of the filtered stream back to the dissolver allows filtrating a polymerization mixture containing an important content of insoluble material with small filtration units, thus reducing the required investments costs to start recycling polystyrene. The invention is also remarkable in that the dissolver form therefore part of the filtration system and has the double function of dissolver and storage tank (during the filtration step) allowing therefore to alternate the production of both virgin material (i.e. without any recycled polymer) and of material comprising a given amount of recycled polymer on the same installation.

Preferably, in step c), more than 70 wt % of the stream of the filtered polymerization mixture is redirected back to the dissolver, more preferably 100 wt % of the stream of the filtered polymerization stream is redirected back to the dissolver. The weight percent being based on the total weight of the stream of the filtered polymerization mixture. Indeed, preferably, the filtering step c) is conducted in a batch mode.

In a preferred embodiment, the step c) of the process includes delivering at least a part of the stream of the filtered polymerization mixture exiting the filtration system at the top of the dissolver, above the surface of the polymerization mixture.

This aspect of the invention allows dealing with the floating insoluble material at the top surface of the polymerization mixture. Indeed, delivering said stream above the surface will generate turbulence on the top surface that transports the floating insoluble material to mix it with the polymerization mixture so that it can be filtered with the other insoluble material before it decants again to the top surface.

In a preferred embodiment, the polymerization mixture produced in step b) has a viscosity as measured at 20° C. of at least 40 cP, preferably of at least 50 cP, more preferably of at least 60 cP.

Preferably, the steps a) and b) further comprise providing at least one rubber to the dissolver and dissolving the at least one rubber in the monovinylaromatic monomer.

In another preferred embodiment, the polymerization mixture produced in step b) comprises at least 12 wt % of PCR-PS as based on the total weight of the polymerization mixture, preferably at least 15 wt % of PCR-PS.

Preferably, the polymerization mixture produced in step b) comprises at most 50 wt % of PCR-PS as based on the total weight of the polymerization mixture, more preferably at most 40 wt % of PCR-PS, and even more preferably at most 30 wt % of PCR-PS.

The content of PCR-PS within the polymerization mixture produced in step b) allows reaching the targeted content of recycled material within the final product but also allows reaching a selected viscosity. When a targeted viscosity of at least 40 cP is achieved, the floating insoluble material can be kept within the polymerization mixture long enough to be filtered. The viscosity of the polymerization mixture produced in step b) can also be adjusted by the addition of one or more rubber.

In a preferred embodiment, the step c) further includes:
  a sub-step c1) of filtering the polymerization mixture obtained in step b) in a filtration system;
  a sub-step c2) of providing and mixing additional PCR-PS to the filtered polymerization mixture obtained in step c1) in order to increase the content of PCR-PS in the polymerization mixture, the filtering operation being interrupted in the meantime;
  a sub-step c3) of filtering the polymerization mixture obtained in sub-step c2) in the filtration system;
  with preference sub-steps c2) and c3) are repeated one or more time.

The invention provides a process wherein the dissolving and the filtering operation are alternated so as to gradually increase the content of the recycled material in the dissolver. This aspect of the invention allows the above process to be used as a cleaning process of a dissolver when a filtration has been performed in a continuous mode with several filters arranged in series as described in prior art. The incorporation of the new recycled material allows maintaining the same content of recycled material in the final product.

This aspect of the invention is also interesting regarding the flexibility of the process provided, in particular for small installation devoid of filters-bags arranged in series with an important filtering surface. Indeed, it allows introducing in the final monovinylaromatic polymers containing PCR-PS, PCR-PS having a high content of insoluble material without the need of preliminary dimensioning the filters. The invention allows introducing in the final monovinylaromatic polymers containing PCR-PS, PCR-PS having a high content of insoluble material with a filtration unit having small filters, and without the need of an upgrade of these filters.

Also, it has been found that introduction of different PCR-PS may result in different viscosity in the final polymerization mixture. The viscosity of the polymerization mixture is one of the aspects limiting the concentration of recycled material that can be incorporated in the final monovinylaromatic polymers, the invention allows monitoring the increase of the viscosity and therefore optimizing the content of recycled material in the final monovinylaromatic polymers containing PCR-PS to be as high as possible.

With preference, one or more of the following features can be used to further define the inventive process:
- The PCR-PS is subjected to a pretreatment before being provided to the dissolver in step a), wherein the pretreatment includes grinding the PCR-PS and/or washing the PCR-PS with diluted caustic soda.
- The PCR-PS is selected to have a melt flow rate (MI5) of at least 5 g/10 min as determined according to ISO 1133 conditions H at 200° C. under a load of 5 kg, preferably of at least 7 g/10 min, more preferably of at least 10 g/10 min, even more preferably of at least 12 g/10 min and most preferably of at least 14 g/10 min.
- The PCR-PS is selected to have a content of insoluble material of a size superior or equal to 100 μm of at most 10.0 wt % as based on the total weight of the PCR-PS, preferably of at most 7.5 wt %, more preferably of at most 5.0 wt %, even more preferably of at most 3.5 wt %, most preferably of at most 2.5 wt %, and even most preferably of at most 2.0 wt %.
- The PCR-PS is selected from dairy packaging waste, EPS post-consuming fish boxes, EPS cut off building insulation or EPS post-consumer electronic.
- The step b) of dissolution is conducted at a temperature ranging from 15 to 40° C.
- The content of PCR-PS provided in step a) is selected in order that, before being subjected to the filtration step c), the polymerization mixture produced in step b) contains not more than 0.60 wt % of insoluble material of a size superior or equal to 100 pm as based on the total weight of the polymerization mixture, preferably not more than 0.50 wt %, more preferably not more than 0.40 wt %, even more preferably not more than 0.30 wt %, most preferably not more than 0.20 wt %, and even most preferably not more than 0.15 wt % or not more than 0.10 wt %.

In a preferred embodiment, the step d) ending the filtering of the polymerization mixture is performed when the pressure at the exit of the filter is at least 0.8 times the pressure at the entry of the filter, preferably at least 0.9 times, more preferably when there is no difference of pressure between the entry and the exit of the filter.

In an embodiment, the process further comprises the steps of
e) forming a reaction mixture from the filtered polymerization mixture recovered from step d), with the optional addition of a free radical initiator;
f) subjecting the reaction mixture to a free-radical polymerization in one or more polymerization reactors in order to produce a monovinylaromatic polymer comprising PCR-PS.

Preferably, the monovinylaromatic polymer comprising post-consumer recycled polystyrene produced in step f) is selected from general purpose polystyrene (GPPS) and high impact polystyrene (HIPS).

More preferably, the monovinylaromatic polymer comprising post-consumer recycled polystyrene produced in step f) is general purpose polystyrene (GPPS) and the process further comprises a step of producing expanded polystyrene (EPS) from said general purpose polystyrene (GPPS).

According to a second aspect, the invention provides a installation to produce a monovinylaromatic polymer comprising post-consumer recycled polystyrene (PCR-PS) according to the first aspect, the installation comprising:
at least one dissolver with agitating means;
suppliers to provide PCR-PS and monovinylaromatic monomer to the dissolver;
a filtration system;
the installation is remarkable in that it further comprises lines to redirect at least a part of the stream of filtered polymerization mixture exiting the filtration system back to the dissolver.

In an embodiment, the invention provides an installation to produce a monovinylaromatic polymer comprising post-consumer recycled polystyrene (PCR-PS) by the process according to the first aspect, the installation comprising:
a grinder
at least one dissolver with agitating means;
suppliers to provide PCR-PS and monovinylaromatic monomer to the dissolver;
a filtration system;
wherein the installation further comprises lines to redirect at least a part of the stream of filtered polymerization mixture exiting the filtration system back to the dissolver.

In an embodiment, the filtration system comprises only one filter.

With preference, the lines to redirect at least a part of the stream of filtered polymerization mixture exiting the filtration system back to the dissolver are arranged to deliver the stream of filtered polymerization mixture at the top of the dissolver above of the top surface of the polymerization mixture.

In a preferred embodiment, the filtration system comprising one or more filters, and the dissolver being suitable to contain a given volume of polymerization mixture, the one or more filters of the filtration system are selected to have a total filtration surface of at most 5 m$^2$ per 1 m$^3$ of the polymerization mixture to be filtered contained in the dissolver; preferably at most 3 m$^2$, more preferably at most 2.6 m$^2$.

Indeed, the invention allows to perform the recycling of polystyrene with installation having filtration system ten times lower than in prior art, therefore considerably reducing the investment costs required.

In an embodiment, the filtration system includes one or at least one self-cleaning filter.

In an embodiment, the lines are arranged to redirect at least a part of the stream of filtered polymerization mixture exiting the filtration system back to the dissolver after its passage in one filter.

In an embodiment, the installation further comprises
at least one polymerization reactor;
at least one optional storage tank; and lines to direct a stream of filtered polymerization mixture exiting the filtration system to a polymerization reactor or to the storage tank when present and optional lines to direct a stream of filtered polymerization mixture from the optional storage tank when present to the polymerization reactor.

DETAILED DESCRIPTION OF THE INVENTION

For the purpose of the invention the following definitions are given:

As used herein, a "polymer" is a polymeric compound prepared by polymerizing monomer, whether of the same or a different type. The generic term polymer thus embraces the term homopolymer, usually employed to refer to polymers prepared from only one type of monomer, and the terms copolymer and interpolymer as defined below.

As used herein, a "copolymer", "interpolymer" and like terms mean a polymer prepared by the polymerization of at least two different types of monomer. These generic terms include polymers prepared from two or more different types of monomer, e.g. terpolymers, tetrapolymers, etc.

As used herein, "blend", "polymer blend" and like terms refer to a composition of two or more compounds, typically two or more polymers. As used herein, "blend" and "polymer blend" also include "reactor blends" such as where a monomer is polymerized in the presence of a polymer.

As used herein, the terms "post-consumer recycled polystyrene" (PCR-PS) refers to a styrenic resin that has been processed to be incorporated into a consumer product and collected after use as plastic waste.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of endpoints also includes the recited endpoint values themselves (e.g. from 1.0 to 5.0 includes both 1.0 and 5.0). Any numerical range recited herein is intended to include all sub-ranges subsumed therein.

The particular features, characteristics or embodiments may be combined in any suitable manner, as would be apparent to a person skilled in the art from this disclosure, in one or more embodiments.

Figure 1:
FIG. 1 is a picture of the concentrated mixture found at the bottom of a dissolver as a result of the sedimentation of the insoluble material.
Figure 2:
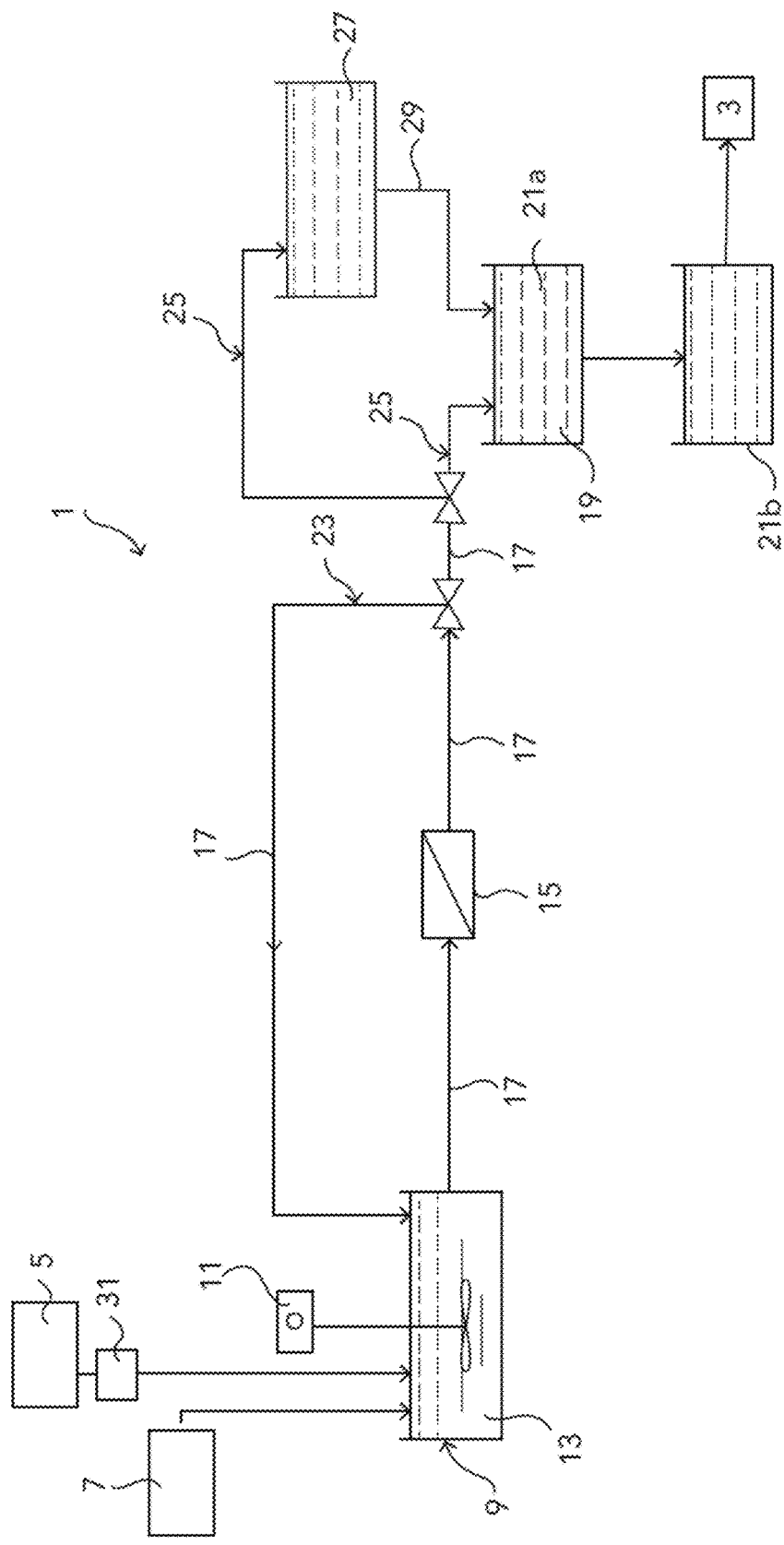
FIG. 2 illustrates the installation according to the invention.

In the following description, the process is described in parallel of the installation suitable to perform such process with reference to FIG. 2.

The invention provides a process and an installation 1 to produce a monovinylaromatic polymer 3 comprising post-consumer recycled polystyrene (PCR-PS) 5 wherein the process comprises the steps of:

a) providing the PCR-PS 5 and monovinylaromatic monomer 7 to at least one dissolver 9;
b) mixing the PCR-PS 5 and the monovinylaromatic monomer 7 within the dissolver 9 to dissolve the PCR-PS 5 in the monovinylaromatic monomer 7 so as to produce a polymerization mixture 13;
c) filtering the polymerization mixture 13 in a filtration system 15 in order to obtain a stream of filtered polymerization mixture 17;
d) ending the filtering of the polymerization mixture 13 and recovering the filtered polymerization mixture 17;

further wherein the step c) of filtering the polymerization mixture 13 includes continuously redirecting at least a part of the stream of filtered polymerization mixture 17 back to the dissolver 9 and mixing it with the polymerization mixture 13 so as to continuously reduce the content of insoluble material in the polymerization mixture 13 contained in the dissolver 9.

In a preferred embodiment, the invention provides a process and an installation 1 to produce a monovinylaromatic polymer 3 comprising post-consumer recycled polystyrene (PCR-PS) 5 wherein the process comprises the steps of:

a) providing the PCR-PS 5 and monovinylaromatic monomer 7 to at least one dissolver 9;
b) mixing the PCR-PS 5 and the monovinylaromatic monomer 7 within the dissolver 9 to dissolve the PCR-PS 5 in the monovinylaromatic monomer 7 so as to produce a polymerization mixture 13;
c) filtering the polymerization mixture 13 in a filtration system 15 in order to obtain a stream of filtered polymerization mixture 17;
d) ending the filtering of the polymerization mixture 13 and recovering the filtered polymerization mixture 17;
e) forming a reaction mixture 19 from the filtered polymerization mixture 17 recovered from step d), with the optional addition of a free radical initiator;
f) subjecting the reaction mixture 19 to a free-radical polymerization in one or more polymerization reactor (21a,21b) in order to produce a monovinylaromatic polymer 3 comprising post-consumer recycled polystyrene;

further wherein the step c) of filtering the polymerization mixture 13 includes continuously redirecting at least a part of the stream of filtered polymerization mixture 17 back to the dissolver 9 and mixing it with the polymerization mixture 13 so as to continuously reduce the content of insoluble material in the polymerization mixture 13 contained in the dissolver 9.

The process according to the invention is carried out in an installation 1 comprising:
at least one dissolver 9 with agitating means 11;
suppliers to provide PCR-PS 5 and monovinylaromatic monomer 7 to the dissolver 9;
a filtration system 15;
wherein the installation further comprises lines 23 to redirect at least a part of the stream of filtered polymerization mixture 17 exiting the filtration system 15 back to the dissolver 9.

In a preferred embodiment, the installation 1 comprises:
an optional grinder 31
at least one dissolver 9 with agitating means 11;

suppliers to provide PCR-PS 5 and monovinylaromatic monomer 7 to the dissolver 9;
a filtration system 15;
at least one polymerization reactor 21;
at least one optional storage tank 27; and
lines 25 to direct a stream of filtered polymerization mixture 17 exiting the filtration system 15 to the polymerization reactor 21 or to the storage tank 27 when present and optional lines 29 to direct a stream of filtered polymerization mixture 17 from the optional storage tank 27 when present to the polymerization reactor 21;
wherein the installation further comprises lines 23 to redirect at least a part of the stream of filtered polymerization mixture 17 exiting the filtration system 15 back to the dissolver 9.

In step a) of the process according to the invention, the PCR-PS 5 and the monovinylaromatic monomer 7 are provided by the means of suppliers to the dissolver 9. The installation 1 may comprise further suppliers (not represented) in order to provide other feedstock to the dissolver 9 such as for example one or more comonomer (such as olefins and/or conjugated diene), diluents (e.g. ethyl-benzene), chain transfer agents, coupling agents, initiators (such as free-radical initiators or anionic initiators), impact enhancement agents, plasticizer and/or other additives such as colorant, flame retardant agents, etc. In an embodiment of the invention, the installation is configured to produce high impact polystyrene (HIPS) and comprises a supplier to provide one or more rubbers to the dissolver, the rubbers being provided in a dissolved form or not.

The PCR-PS used in the invention consists entirely or essentially of styrenic polymers (for instance HIPS, EPS or GPPS resins) or may include styrenic polymers together with other material (e.g. insoluble material) that may affect the properties of the styrenic material, for instance, the appearance of the styrenic material. The other material can comprise, for instance, metallic objects, other polymeric materials (for instance polyolefins such as polyethylene, polypropylene, etc.); polyacrylates such as polyacrylonitrile; polyconjugated dienes such as polybutadiene; polyvinyl halides such as polyvinylchlorides; and the likes). As far as the other material is insoluble within the monovinylaromatic monomer, it is preferably removed from the polymerization mixture before polymerization. The removal of said material is done in the filtering system.

In order to facilitate the cleaning of the polymerization mixture, it may be advantageous to select the PCR-PS that will be provided to the dissolver 9 in step a) of the process. Thus, in an embodiment, the PCR-PS provided in step a) has a content of insoluble material (i.e. material insoluble in monovinylaromatic monomer) of a size superior or equal to 100 μm of at most 10.0 wt % as based on the total weight of the PCR-PS, preferably of at most 7.5 wt %, more preferably of at most 5.0 wt %, even more preferably of at most 3.5 wt % as based on the total weight of the PCR-PS, most preferably at most 3.0 wt %, even most preferably of at most 2.5 wt %,1 or of at most 2.0 wt %, or of at most 1.5 wt %, or of at most 1.0 wt %.

The PCR-PS can also be selected for its mechanical properties. Indeed, properties such as the melt flow rate (MI5) of the PCR-PS may influence the final properties obtained on the monovinylaromatic polymer produced. In an embodiment of the invention wherein the production of EPS is targeted, the PCR-PS is selected to have a melt flow rate (MI5) ranging from 10 to 30 g/10 min as determined according to ISO 1133 conditions H at 200° C. under a load of 5 kg. In an embodiment of the invention wherein the production of HIPS is targeted, the PCR-PS is selected to have a melt flow rate (MI5) ranging from 2 to 15 g/10 min as determined according to ISO 1133 conditions H at 200° C. under a load of 5 kg.

In a preferred embodiment, the PCR-PS is selected to have a melt flow rate (MI5) of at least 5 g/10 min as determined according to ISO 1133 conditions H at 200° C. under a load of 5 kg, preferably of at least 7 g/10 min, more preferably of at least 10 g/10 min, even more preferably of at least 12 g/10 min, most preferably of at least 14 g/10 min, even most preferably of at least 16 g/10 min.

In an embodiment, the PCR-PS is selected to have a melt flow rate (MI5) of at most 28 g/10 min as determined according to ISO 1133 conditions H at 200° C. under a load of 5 kg, preferably of at most 25 g/10 min, more preferably of at most 23 g/10 min.

Preferably, the PCR-PS comprises non-coloured polystyrene. The PCR-PS is preferably selected from GPPS, HIPS and EPS. In a preferred embodiment, the PCR-PS has expanded polystyrene (EPS). The PCR-PS can be selected from dairy packaging waste, such as fish boxes. The PCR-PS is preferably selected from EPS post-consuming fish boxes, EPS cut off building insulation or EPS post-consumer electronic In a preferred embodiment, PCR-PS is provided to the dissolver in flake form or in compacted form, preferably in flake form.

As seen above, the PCR-PS may contain material that is soluble in monovinylaromatic monomers such as biopolymers like polylactide acid or polybutadiene. This further material may also influence the mechanical properties of the monovinylaromatic polymer produced.

Thus, the PCR-PS is preferably selected to be devoid of said soluble material, or to contains less than 1.0 wt % of said soluble material different from the styrenic material, as based on the total weight of the PCR-PS.

In a preferred embodiment of the invention, the PCR-PS is subjected to a pretreatment before being provided to the dissolver in step a). In accordance with the invention, the pretreatment includes a grinding step to ease its dissolution within the monovinylaromatic monomer and the subsequent filtration process. Indeed, the raw PCR-PS often shows a low apparent density and is therefore compacted for ease its handling and transportation. The invention advantageously provides a pretreatment of grinding the compacted PCR-PS in flakes in order to make its introduction into the dissolver easier and to make the dissolution time shorter.

In an embodiment, the pretreatment may also include water and/or caustic washing. Indeed, the PCR-PS available from recycles collecting/sorting companies have often been in contact with food and other streams of recycles. It is then likely to contain organic waste components such as triglycerides, or other types of contaminants, such as metallic salts. This washing step with water and or with caustic soda allows eliminating at least a part of these undesirable contaminants.

In an embodiment, the pretreatment of the PCR-PS may also include a separation by flotation and centrifugation. Indeed, the PCR-PS, and especially when the PCR-PS is EPS, shows a low density that allows separating it from contaminants or impurities that have higher apparent density. The separation medium is advantageously water in which the PCR-PS is floating. Water is separated from the other contaminant by centrifugation.

The monovinylaromatic monomer is an aromatic having a vinyl function. By way of example monovinylaromatic monomer can be selected from styrene, vinyl toluene, alpha methyl styrene, alphaethylstyrene, methyl-4-styrene, methyl-3-styrene, methoxy-4-styrene, hydroxymethyl-2-styrene, ethyl-4-styrene, ethoxy-4-styrene, dimethyl-3,4-styrene, chloro-2-styrene, chloro-3-styrene, chloro-4-methyl-3-styrene, tert.-butyl-3-styrene, dichloro-2,4-styrene, dichloro-2,6-styrene,vinyl-1 naphthalene, vinyl anthracene and any mixture thereof. It would not depart from the scope of the invention to use more than one monovinylaromatic monomer. Preferably, the monovinylaromatic monomer includes or consists of styrene.

The monovinylaromatic monomer is preferably provided first to the dissolver. The PCR-PS is preferably supplied to the dissolver in a controlled manner in order to avoid the formation of agglomerates within the monovinylaromatic monomer that may be difficult to dissolve. In a preferred embodiment of the invention, the PCR-PS is provided to the dissolvers in two or more subsequent steps separated by filtration steps as it will be seen later. The respective amounts of the monovinylaromatic monomer and of the PCR-PS provided to the dissolver are determined from the targeted concentration of PCR-PS in the produced monovinylaromatic polymer.

In step b) of the process according to the invention, the PCR-PS 5 and the monovinylaromatic monomer 7 are mixed together within the dissolver 9 to dissolve the PCR-PS 5 in the monovinylaromatic monomer 7 so as to produce a polymerization mixture 13. This step is preferably conducted at ambient temperature, for example a temperature ranging from 15 to 40° C.

As it will be seen in detail below, the dissolution and the filtration processes are operated in batch mode. Therefore, the installation 1 according to the invention may include more than one dissolver wherein one dissolver is providing the dissolved and filtered polymerization downstream whereas one or more further dissolvers are preparing fresh batches of the polymerization mixture. In such a configuration, the installation may continuously produce the polymerization mixture. The polymerization mixture comprises insoluble material originated from the dissolved PCR-PS that needs to be removed before the polymerization reaction.

In a preferred embodiment of the invention, the polymerization mixture produced in step b) has a viscosity as measured at 20° C. of at least 40 cP, preferably of at least 50 cP, more preferably of at least 60 cP. Indeed, when the viscosity is too low, the insoluble material (i.e. the contaminant) may float on the surface of the polymerization mixture rendering the filtration process according to the invention difficult to perform. Should the viscosity of the polymerization mixture is too low, the person skilled in the art may raise the viscosity by increasing the content of PCR-PS within the polymerization mixture. Another possible way to increase the viscosity is to add other components such as one or more rubbers in case the final product is a HIPS. Thus, in an embodiment of the invention, the steps a) and b) further comprise providing at least one rubber to the dissolver and dissolving the at least one rubber in the monovinylaromatic monomer.

Where there is no component that may increase the viscosity of the polymerization mixture other than the PCR-PS, the polymerization mixture produced in step b) comprises at least 12 wt % of PCR-PS as based on the total weight of the polymerization mixture, preferably at least 15 wt % of PCR-PS.

In an embodiment, the polymerization mixture produced in step b) comprises at most 50 wt % of PCR-PS as based on the total weight of the polymerization mixture, preferably at most 40 wt % of PCR-PS, more preferably at most 30 wt % of PCR-PS and even more preferably at most 25 wt % of PCR-PS.

In step c) of the process according to the invention, the polymerization mixture 13 is filtered in a filtration system 15 in order to obtain a stream of filtered polymerization mixture 17. At least a part of the stream of filtered polymerization mixture 17 is redirected back to the dissolver 9 and mixed with the polymerization mixture 1-3 so as to continuously reduce the content of insoluble material within the polymerization mixture 13 contained in the dissolver 9. In a preferred embodiment, more than 70 wt % of the stream of filtered polymerization mixture 17 is redirected back to the dissolver, as based on the total weight of the stream of filtered polymerization mixture, preferably more than 80 wt %, more preferably more than 90 wt % and most preferably 100 wt % of the stream of filtered polymerization mixture is redirected back to the dissolver 9. With preference, lines 23 are arranged to redirect at least a part of the stream of filtered polymerization mixture 17 exiting the filtration system 15 back to the dissolver 9 after its passage in one filter.

With preference, the step c) includes delivering at least a part of the stream of the filtered polymerization mixture 17 exiting the filtration system 15 at the top of the dissolver 9, above the surface of the polymerization mixture 13.

As it can be seen, the filtering step c) is conducted in a batch mode. A loop of recirculation of the polymerization mixture is formed. Preferably, the polymerization mixture is passed through a succession of at least two filters having screens of different meshes such as for instance an 800-1000 µm pre-filter and one or more filter bags. The filter bags can be simple or double filter bags. The meshes size is preferably ranging from 100 to 600 µm, preferably from 100 to 400 µm, more preferably ranging from 100 to 200 µm. In an embodiment of the invention, the filtration system may further include a self-cleaning filter.

This configuration allows conducting the filtration with smaller filters than the ones that would be required if the filtration step was conducted in continuous. Also, it allows limiting the plugging of the filter as the filtration is conducted with a concentration of insoluble material that is inferior that it usually is for a given content of PCR-PS diluted within the monovinylaromatic monomer, except in the very beginning of the filtration step during the formation of the loop.

In a preferred embodiment, should the filtering system comprises filter bags, the polymerization mixture contains not more than 0.60 wt % of insoluble material before filtration, as based on the total weight of the polymerization mixture, preferably not more than 0.50 wt %, more preferably not more than 0.40 wt %, even more preferably not more than 0.30 wt %, most preferably not more than 0.20 wt %, and even most preferably not more than 0.15 wt % or not more than 0.10 wt %.

Should the desired concentration of the PCR-PS would result in a higher content of insoluble material within the polymerization mixture, the step of dissolution can be conducted in two or more successive steps in the between of which complete or partial filtration of the polymerization mixture is performed. This allows to progressively increase the content of PCR-PS within the polymerization mixture while conducting the successive filtration steps on mixture having a low content of the insoluble material.

In an embodiment of the invention, the step c) further includes:
    a sub-step c1) of filtering the polymerization mixture obtained in step b) in a filtration system;

a sub-step c2) of providing and mixing additional PCR-PS to the filtered polymerization mixture obtained in sub-step c1) in order to increase the content of PCR-PS in the said polymerization mixture, the filtering operation being interrupted in the meantime;

a sub-step c3) of filtering the polymerization mixture obtained in sub-step c2) in the filtration system;

with preference sub-steps c2) and c3) are repeated one or more time.

The process of the invention can be used as a recycling process, or to perform both recycling and cleaning of a dissolver 9.

As it is understood from the above, the process according to the invention may provide sequential filtration steps.

The filtration system 15 of the installation comprises one or more filters, preferably it comprises only one filter. The dissolver 9 is suitable to contain a given volume of polymerization mixture 13, the one or more filters of the filtration system are selected to have the total filtration surface of the filtration system being at most 5 m² per 1 m³ of the polymerization mixture contained in the dissolver; preferably at most 3 m², more preferably at most 2.6 m².

In step d) of the process according to the invention, the filtering of the polymerization mixture 13 is ended and the filtered polymerization mixture 17 is recovered. In this step, the person skilled in the art will determine that the polymerization mixture is clean enough for the application considered so that the filtering step can be ended.

Indeed, sometimes the filtration mixture may allow a low content of the residual insoluble material and still be able to achieve the targeted properties of the final polymer. The time for ending the loop filtering process can be determined in several ways such as for example by analysis of the polymerization mixture. However, in a preferred embodiment, the filtering of the polymerization mixture is followed by measurement of the pressure on one filter. Indeed, the pressure difference at the entry and at the exit of the filter varies with time as the filter is collecting the insoluble material. When there is no more insoluble material to collect, the difference of pressure between the entry and the exit of the filter does not vary anymore indicating that filtration is terminated. Thus in an embodiment, the step d) ending the filtering of the polymerization mixture when the pressure at the exit of the filter is at least 0.8 times the pressure at the entry of the filter, preferably at least 0.9 times, more preferably when there is no difference of pressure between the entry and the exit of the filter.

In step e) of the process according to the invention, a reaction mixture is formed from the filtered polymerization mixture recovered from step d). Indeed some components such as further diluent and/or free radical initiator may be directly injected in the polymerization reactor wherein the filtered polymerization mixture has been transferred.

Typical free radical initiators include azo compounds and peroxides. Exemplary peroxides include benzoyl peroxide, t-butyl 2-methylperbenzoate tert-butylperoxybenzoate, tert-butylperoxyacetate, di-tert-butylperoxide, dibenzoylperoxide, dilauroylperoxide, 1,1-bis-tert-butylperoxycyclohexane, 1,1,-bis-tert-butylperoxy-3,3,5-trimethylcyclohexane, 1-3-bis t-butylperoxy-(3,3,5-trimethylcyclohexane), di(2-ethylhexyl)peroxydicarbonate, t-amyl peroctoate, t-butyl peroxyoctoate, di-cumylperoxide, polyesther poly-t-butylperoxycarbonate, di-t-butyl diperoxyazelate and dicumylperoxide. Exemplary azo initiators include 2,2'-azobis (isobutyronitrile), 2,2'-azobis (2,4-dimethylvaleronitrile) and 1,1'-azobis (cyclohexanebarbonitrile).

The initiators may be employed in amounts from 0 to 2000 wt ppm, preferably from 100 to 1500 wt ppm based on the monovinylaromatic monomer.

The installation 1 comprises at least one polymerization reactor having one or more reaction vessels or zones. When the installation includes more than one reactor, they may operate in a series configuration and/or in a parallel configuration. The reactor can be continuous stirred reactors (CSTR), stirred tower reactors, axially segregated reactors, pipes reactors, etc. In the reactor vessels or zones, the monovinylaromatic monomer is polymerized according to a free radical bulk solution or solution polymerization process. For instance, the reaction may be conducted in the presence of an initiator as already seen above, which may be a peroxide-based or an azo-based initiator.

In step f) of the process according to the invention, the reaction mixture 19 is subjected to polymerization, for instance to a free-radical polymerization, in the one or more polymerization reactors in order to produce a monovinylaromatic polymer comprising post-consumer recycled polystyrene.

The reaction conditions (such as the temperature, pressure, flow rate, the material particulars, component concentration, etc.) are selected in order to achieve the targeted physical, mechanical and rheological properties such as density, melt-flow rate etc.

With preference, the installation comprises two or more polymerization reactors in series. In an embodiment, the first one is operated at temperatures ranging from 105 to 150° C., and the second and subsequent ones at a temperature ranging from 115 to 180° C.

The effluent from the reactors may include the polymer melt as well as non-polymer components such as the diluent and/or unreacted monomer/comonomer. The polymer melt is separated from the non-polymer components by known techniques including the use of various devolatilizers and/or flash line heater. The recovered non-polymer components can be processed in a fractionation system wherein the diluent and/or unreacted monomer/comonomer are separated from other components and are further returned to the dissolver(s) or to the reactor(s).

The polymer melt is a resin of monovinylaromatic polymer containing both virgin and PCR-PS material. The polymer melt can be further processed in an extrusion/loadout system to form pellets. Different additives such as UV inhibitors, colourants, antioxidants and the likes may be introduced to the resin during the extrusion process. The invention provides monovinylaromatic polymer comprising post-consumer recycled polystyrene, said monovinylaromatic polymer being selected from general purpose polystyrene (GPPS) and high impact polystyrene (HIPS).

The monovinylaromatic polymer according to the invention comprises from 5 to 50 wt % of PCR-PS. In a preferred embodiment, the monovinylaromatic polymer according to the invention comprises at least of 12 wt % of PCR-PS as based on the total weight of the monovinylaromatic polymer, preferably at least 15 wt % of PCR-PS.

In an embodiment, the monovinylaromatic polymer according to the invention comprises at most 50 wt % of PCR-PS as based on the total weight of the monovinylaromatic polymer, preferably at most 40 wt % of PCR-PS, more preferably at most 30 wt % of PCR-PS.

The monovinylaromatic polymer produced according to the invention has an MFR ranging from 3 to 10 g/10 min as determined according to ISO 1133 conditions H at 200° C. under a load of 5 kg.

In an embodiment, the monovinylaromatic polymer produced according to the invention has an MFR of at least 3.5 g/10 min, as determined according to ISO 1133 conditions H at 200° C. under a load of 5 kg, preferably of at least 3.6 g/10 min, more preferably of at least 4.0 g/10 min and most preferably of at least 4.1 g/10 min.

In an embodiment, the monovinylaromatic polymer produced according to the invention has an MFR of at most 8.5 g/10 min, as determined according to ISO 1133 conditions H at 200° C. under a load of 5 kg, preferably of at most 7.5 g/10 min, more preferably of at most 6.5 g/10 min and most preferably of at most 6.0 g/10 min.

The pellets can be used in a subsequent process to form articles by known techniques such as extrusion, thermoforming, injection moulding, etc. In an embodiment of the invention, the resin is mixed with a blowing agent to produce a foamed resin that may be subsequently extruded into a sheet and thermoformed to form articles. In a preferred embodiment of the invention, the process includes expanding the pellets and moulding the expanded resin to produce an article. The expansion processes are well-known to the person skilled in the art.

In an embodiment, the monovinylaromatic polymer comprising post-consumer recycled polystyrene produced in step f) is general purpose polystyrene (GPPS) and in that the process further comprises a step of producing expanded polystyrene (EPS) from said general purpose polystyrene (GPPS).

Tests Methods

The melt flow rate of the composition is measured according to ISO 1133. For polystyrene, the melt flow rate (MI5) is measured according to ISO 1133 conditions H at 200° C. under a load of 5 kg.

Molecular weight: The molecular weight may be measured using gel permeation chromatography. Different solvents can be used, a typical solvent is tetrahydrofuran. Polystyrene standards may be used for calibration.

The molecular weight averages used in establishing molecular weight/property relationships are the number average ($M_n$), weight average ($M_w$) and z average ($M_z$) molecular weight. These averages are defined by the following expressions and are determined from the calculated $M_i$:

$$M_n = \frac{\sum_i N_i M_i}{\sum_i N_i} = \frac{\sum_i W_i}{\sum_i W_i / M_i} = \frac{\sum_i h_i}{\sum_i h_i / M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i M_i}$$

$$M_i = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The Mw, Mz and Mn are typically determined by gel permeation chromatography using narrow polystyrene standards for calibration.

The content of PCR-PS in the monovinylaromatic polymer is determined according to a mass balance based on the concentration of the PCR-PS in the dissolver and the optional additional monovinylaromatic monomer incorporated in the polymerization reactor. Wherein the PCR-PS concentration in the dissolver is determined according to the following relationship:

PCR-PS Concentration in Dissolver=100×Weight of PCR-PS Added in the dissolver/[Weight of monovinylaromatic Monomer Added in the dissolver+Weigh of PCR-PS Added in the dissolver]

The following non-limiting examples illustrate the invention.

EXAMPLES

The advantages of the inventive process are shown in the following examples.

Example 1

Selection of the PCR-PS

Table 1 displays the properties of the PCR-PS used in the inventive process.

TABLE 1

|  | PCR 1 | PCR 2 | PCR 3 |
|---|---|---|---|
| Form | Flakes | Flakes | Chunks (compacted and grinded) |
| MI5 (g/10 min) | 19.6 | 18.0 | 14.3 |
| Apparent density (kg/m³) | n.d. | 59 | 126-157 |
| Mn (kDa) | 78 | 76 | 85 |
| Mw (kDa) | 179 | 183 | 204 |
| Mz (kDa) | 297 | 345 | 375 |
| Mw/Mn | 2.3 | 2.4 | 2.4 | n.d. = not determined

Example 2

Dissolution of the PCR-PS within the Monovinylaromatic Monomer

Dissolution of PCR 2 and PCR 3 was conducted for each product in styrene monomer at 30° C. during a time ranging from 1 to 2 hours depending on the content of recycled material added within the dissolver.

Figure 3:
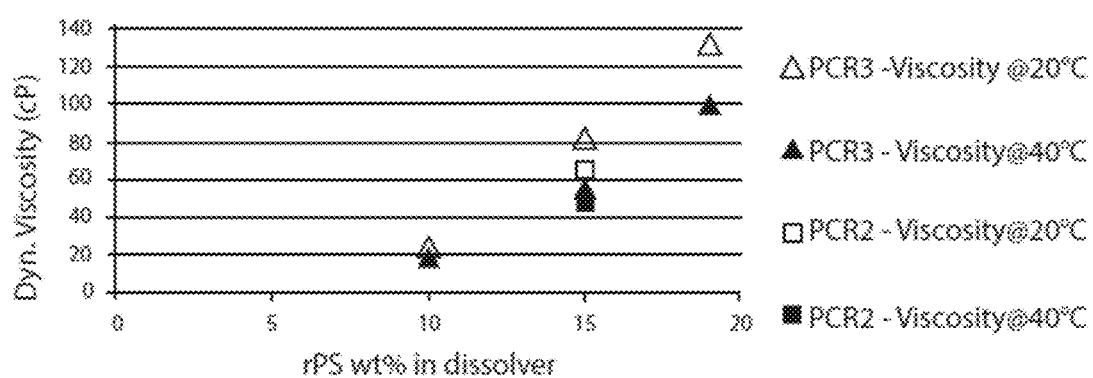
FIG. 3 plots the viscosity of the polymerization reaction according to the content of PCR-PS.

Table 2 displays the viscosity properties of the polymerization mixture obtained, the data are also reported in FIG. 3.

TABLE 2

|  | PCR-PS | PCR-PS (wt %) | Viscosity 20° C. (cP) | Viscosity 40° C. (cP) |
|---|---|---|---|---|
| E1 | PCR 3 | 10 | 23 | 18.5 |
| E2 | PCR 3 | 19 | 132 | 100 |
| E3 | PCR 3 | 15 | 82 | 55 |
| E4 | PCR 2 | 15 | 65 | 47 |

It was observed that the insoluble material was floating on the surface of the polymerization mixture for E1 whereas E2, E3 and E4 show a repartition of insoluble material in the mass.

Example 3

Filtration of the Polymerization Mixture

Filtration was realized in a circulation loop through a pre-filter (800 µm) and two different sizes of filter bags, i.e. a first filter bag of 600 µm and a second double filter bag of 400 µm and 200 µm.

It was shown that complete filtration in batch mode with recirculation loop could be achieved with filter bag having a filtration surface of 10 times lower than the one that would have been needed for a continuous process. Indeed, the surface of filtration of the installation was found to be 1 m$^2$ whereas a surface filtration of 10 m$^2$ would have been necessary for a continuous process with filter bags in series.

Table 3 displays the mass balance of the PCR-PS insoluble material.

TABLE 3

| Total PCR-PS introduced in the dissolver (kg) | Total insoluble material collected in pre-filter (kg) | Total insoluble material collected in filter bags (kg) | The proportion of insoluble material in PCR-PS raw material (% wt.) |
| --- | --- | --- | --- |
| E2 | 480 kg | 1.88 kg | 11.33 kg | 2.75 wt % |
| E4 | 180 kg | 0.11 kg | 0.28 kg | 0.22 wt % |

Example 4

Polymerization of the Final Polymer

Monovinylaromatic resins comprising about 23 wt % of post-consumer recycled polystyrene (PCR-PS) were produced in accordance with the process of the invention.

PCR-PS was provided with defined content to a dissolver and allowed to dissolve at 30° C. with styrene monomer to produce a polymerization mixture. The polymerization mixture was then filtered in a loop filtration arrangement with filter bags, in order to remove the insoluble material.

The resulting stream was then provided to a polymerization reactor to produce the monovinylaromatic resins having the properties as set forth in table 4 and compared to a virgin grade.

TABLE 4

|  | P1 | P2 | P3 (virgin) |
| --- | --- | --- | --- |
| PCR-PS | PCR 3 | PCR 2 | — |
| PCR-PS MI5 (g/10 min) | 14.3 | 18 | — |
| PCR-PS content in pellets (wt %) | 23-25 | 23 | 0 |
| Polymer properties MI5 (g/10 min) | 4.3 | 3.7 | 4 |

From the results, it can be seen that the process according to the invention allows obtaining polymer resins containing more than 20 wt % of recycled polymer that show the same properties than virgin resins.

The invention claimed is:

1. An installation for using a process to produce a monovinylaromatic polymer comprising post-consumer recycled polystyrene (PCR-PS), the installation comprising:
   at least one dissolver with agitating means, wherein the dissolver is configured to provide a polymerization mixture;
   suppliers to provide PCR-PS and monovinylaromatic monomer to the dissolver;
   a filtration system configured to produce, from the polymerization mixture, a stream of filtered polymerization mixture having a reduced content of insoluble materials relative to the polymerization mixture;
   one or more lines connecting the filtration system and the dissolver and configured to redirect at least a part of the stream of filtered polymerization mixture exiting the filtration system back to the dissolver prior to introduction into one or more downstream polymerization reactors;
   the one or more downstream polymerization reactors; and
   lines to direct a stream of filtered polymerization mixture exiting the filtration system to the one or more polymerization reactors, wherein the process comprises:
   a) providing a PCR-PS and a monovinylaromatic monomer to at least one dissolver;
   b) mixing the PCR-PS and the monovinylaromatic monomer within the dissolver to dissolve the PCR-PS in the monovinylaromatic monomer so as to produce a polymerization mixture, wherein the polymerization mixture comprises insoluble material originated from the dissolved PCR-PS;
   c) filtering the polymerization mixture in a filtration system in order to obtain a stream of filtered polymerization mixture;
   d) ending the filtering of the polymerization mixture and recovering the filtered polymerization mixture; and
   e) polymerizing at least a portion of the filtered polymerization mixture in the one or more polymerization reactor to form a monovinylaromatic polymer comprising PCR-PS;
   wherein the step c) of filtering the polymerization mixture includes continuously redirecting at least a part of the stream of the filtered polymerization mixture exiting the filtration system back to the dissolver and mixing it with the polymerization mixture so as to continuously reduce the content of insoluble material in the polymerization mixture contained in the dissolver.

2. The installation according to claim 1, wherein the lines to redirect at least a part of the stream of filtered polymerization mixture exiting the filtration system back to the dissolver are arranged to deliver the stream of filtered polymerization mixture at a top of the dissolver above a top surface of the polymerization mixture.

3. The installation according to claim 1, wherein the filtration system includes one or at least one self-cleaning filter, and/or in that the lines are arranged to redirect at least a part of the stream of filtered polymerization mixture exiting the filtration system back to the dissolver after its passage in one filter.

4. The installation according to claim 1, wherein (c) of the process includes delivering at least a part of the stream of the filtered polymerization mixture exiting the filtration system at the top of the dissolver, above the surface of the polymerization mixture.

5. The installation according to claim 1, wherein the polymerization mixture produced in (b) has a viscosity as measured at 20° C. of at least 40 cP.

6. The installation according to claim 1, wherein the polymerization mixture produced in (b) comprises at least 12 wt % of PCR-PS as based on the total weight of the polymerization mixture PS.

7. The installation according to claim 1, wherein (c) of the process further includes:
- a sub-step c1) of filtering the polymerization mixture obtained in step b) in a filtration system;
- a sub-step c2) of providing and mixing additional PCR-PS to the filtered polymerization mixture obtained in sub-step c1) in order to increase the content of PCR-PS in the polymerization mixture, the filtering operation being interrupted in the meantime;
- a sub-step c3) of filtering the polymerization mixture obtained in sub-step c2) in the filtration system;
- wherein sub-steps c2) and c3) may be repeated one or more times.

8. The installation according to claim 1, wherein:
- the PCR-PS is selected to have a content of insoluble material of a size superior or equal to 100 μm, of at most 3.5 wt % as based on the total weight of the PCR-PS; and/or
- the PCR-PS is subjected to a pretreatment before being provided to the dissolver in (a), wherein the pretreatment includes grinding the PCR-PS and/or washing the PCR-PS with diluted caustic soda.

9. The installation according to claim 1, wherein (d) comprises ending the filtering of the polymerization mixture when the pressure at the exit of the filter is at least 0.8 times the pressure at the entry of the filter.

10. The installation according to claim 1, wherein in (c) more than 70 wt % of the stream of filtered polymerization mixture (17) is redirected back to the dissolver.

11. The installation according to claim 1, wherein the process further comprises:
- after d) and before e): forming a reaction mixture from the filtered polymerization mixture recovered from step d), with the addition of a free radical initiator; and
- at e): subjecting the reaction mixture to a free-radical polymerization in the one or more polymerization reactors to produce the monovinylaromatic polymer comprising PCR-PS.

12. The installation according to claim 1, wherein the filtration system comprises only one filter.

13. The installation according to claim 1, wherein the filtration system comprises one or more filters having a total filtration surface of at most 3 m$^2$ per 1 m$^3$ of the polymerization mixture to be filtered in the dissolver.

14. The installation according to claim 13, wherein the total filtration surface of the one or more filters is at most 2.6 m$^2$ per 1 m$^3$ of the polymerization mixture to be filtered in the dissolver.

15. The installation according to claim 1 wherein the monovinyl aromatic monomer comprises styrene, vinyl toluene, alpha methyl styrene, alphaethylstyrene, methyl-4-styrene, methyl-3-styrene, methoxy-4-styrene, hydroxymethyl-2-styrene, ethyl-4-styrene, ethoxy-4-styrene, dimethyl-3,4-styrene, chloro-2-styrene, chloro-3-styrene, chloro-4-methyl-3-styrene, tert.-butyl-3-styrene, dichloro-2,4-styrene, dichloro-2,6-styrene,vinyl-1-naphthalene, vinyl anthracene, or a mixture thereof.

16. The installation according to claim 1, wherein the monovinylaromatic monomer comprises styrene.

17. The installation of claim 1 further comprising a storage tank and lines configured to direct the stream of filtered polymerization mixture exiting the filtration system to the storage tank.

18. The installation of claim 1, wherein the PCR-PS comprises expanded polystyrene (EPS) post-consuming fish boxes, EPS cut off building insulation, EPS post-consumer electronic, or a combination thereof.

19. An installation for using a process to produce a monovinylaromatic polymer comprising post-consumer recycled polystyrene (PCR-PS), the installation comprising:
- at least one dissolver with agitating means;
- suppliers to provide PCR-PS and monovinylaromatic monomer to the dissolver;
- a filtration system;
- one or more lines connecting the filtration system and the dissolver and configured to redirect at least a part of the stream of filtered polymerization mixture exiting the filtration system back to the dissolver prior to introduction into one or more downstream polymerization reactors;
- the one or more downstream polymerization reactors; and
- lines to direct a stream of filtered polymerization mixture exiting the filtration system to the one or more polymerization reactors, wherein the process comprises:
  - a) providing a PCR-PS and monovinylaromatic monomer to at least one dissolver;
  - b) mixing the PCR-PS and the monovinylaromatic monomer within the dissolver to dissolve the PC-PS in the monovinylaromatic monomer so as to produce a polymerization mixture, wherein the polymerization mixture comprises insoluble material originated from the dissolved PCR-PS;
  - c) filtering the polymerization mixture in a filtration system in order to obtain a stream of filtered polymerization mixture;
  - d) ending the filtering of the polymerization mixture and recovering the filtered polymerization mixture; and
  - e) polymerization at least a portion of the filtered polymerization mixture in the one or more polymerization reactor to form a monovinylaromatic polymer comprising PCR_PS; wherein the step c) of filtering the polymerization mixture includes continuously redirecting at least a part of the stream of the filtered polymerization mixture exiting the filtration system back to the dissolver and mixing it with the polymerization mixture so as to continuously reduce the content of insoluble material in the polymerization mixture contained in the dissolver;
- the installation characterized in that the filtration system comprising one or more filters, and the dissolver being suitable to contain a given volume of polymerization mixture, the one or more filters of the filtration system are selected to have a total filtration surface of at most 5 m$^2$ per 1 m$^3$ of the polymerization mixture to be filtered contained in the dissolver.

20. An installation for using a process to produce a monovinylaromatic polymer comprising post-consumer recycled polystyrene (PCR-PS), the installation comprising:
- at least one dissolver with agitating means;
- suppliers to provide PCR-PS and monovinylaromatic monomer to the dissolver;
- a filtration system;
- one or more lines connecting the filtration system and the dissolver and configured to redirect at least a part of the stream of filtered polymerization mixture exiting the filtration system back to the dissolver prior to introduction into one or more downstream polymerization reactors;
- the one or more downstream polymerization reactors; and
- lines to direct a stream of filtered polymerization mixture exiting the filtration system to the one or more polymerization reactors, wherein the process comprises:
  - a) providing a PCR-PS and a monovinylaromatic monomer to at least one dissolver;

b) mixing the PCR-PS and the monovinylaromatic monomer within the dissolver to dissolve the PCR-PS in the monovinylaromatic monomer so as to produce a polymerization mixture, wherein the polymerization mixture comprises insoluble material originated from the dissolved PCR-PS;
c) filtering the polymerization mixture in a filtration system in order to obtain stream of filtered polymerization mixture;
d) ending the filtering of the polymerization mixture and recovering the filtered polymerization mixture; and
e) polymerization at least a portion of the filtered polymerization mixture in the one or more polymerization reactor to form a monovinylaromatic polymer comprising PCR-PS; wherein the step c) of filtering the polymerization mixture includes continuously redirecting at least a part of the stream of the filtered polymerization mixture exiting the filtration system back to the dissolver and mixing it with the polymerization mixture so as to continuously reduce the content of insoluble material in the polymerization mixture contained in the dissolver the installation further comprising a grinder for subjecting the PCR-PS to grinding before being provided to the at least one dissolver at a).

* * * * *